United States Patent
MacNicol et al.

(10) Patent No.: US 10,198,363 B2
(45) Date of Patent: Feb. 5, 2019

(54) REDUCING DATA I/O USING IN-MEMORY DATA STRUCTURES

(71) Applicant: Oracle International Corporation, Redwood Shores, CA (US)

(72) Inventors: Roger D. MacNicol, Hummelstown, PA (US); Tirthankar Lahiri, Palo Alto, CA (US); Kothanda Umamageswaran, Sunnyvale, CA (US); Adrian Tsz Him Ng, Redwood City, CA (US); Laura Liaoruo Wang, Menlo Park, CA (US); Krishnan Meiyyappan, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 15/268,524

(22) Filed: Sep. 16, 2016

(65) Prior Publication Data
US 2017/0116136 A1    Apr. 27, 2017

Related U.S. Application Data

(60) Provisional application No. 62/245,950, filed on Oct. 23, 2015.

(51) Int. Cl.
 *G06F 17/30* (2006.01)
 *G06F 12/14* (2006.01)
 *H04L 9/06* (2006.01)

(52) U.S. Cl.
 CPC ...... *G06F 12/1408* (2013.01); *G06F 17/3033* (2013.01); *G06F 17/30315* (2013.01);
 (Continued)

(58) Field of Classification Search
 CPC ............ G06F 17/30289; G06F 17/30477
 See application file for complete search history.

(56) References Cited

U.S. PATENT DOCUMENTS

| | | | |
|---|---|---|---|
| 2011/0035369 A1* | 2/2011 | Halasipuram | G06F 17/30474 707/720 |
| 2012/0084287 A1* | 4/2012 | Lakshminarayan | G06F 17/30469 707/737 |

(Continued)

*Primary Examiner* — Izunna Okeke
(74) *Attorney, Agent, or Firm* — Hickman Palermo Becker Bingham LLP; Khachatur V. Papanyan

(57) ABSTRACT

Techniques are described herein for generating and using in-memory data structures to represent columns in data block sets. In an embodiment, a database management system (DBMS) receives a query for a target data set managed by the DBMS. The query may specify a predicate for a column of the target data set. The predicate may include a filtering value to be compared with row values of the column of the target data set. Prior to accessing data block sets storing the target data set from persistent storage, the DBMS identifies an in-memory summary that corresponds to a data block set, in an embodiment. The in-memory summary may include in-memory data structures, each representing a column stored in the data block set. The DBMS determines that a particular in-memory data structure exists in the in-memory summary that represents a portion of values of the column indicated in the predicate of the query. Based on the particular in-memory data structure, the DBMS determines whether or not the data block set can possibly contain the filtering value in the column of the target data set. Based on this determination, the DBMS skips or retrieves the data block set from the persistent storage as part of the query evaluation.

24 Claims, 5 Drawing Sheets

(52) U.S. Cl.
CPC .. *G06F 17/30424* (2013.01); *G06F 17/30867* (2013.01); *H04L 9/0643* (2013.01); *G06F 2212/1052* (2013.01)

(56) References Cited

U.S. PATENT DOCUMENTS

| | | | |
|---|---|---|---|
| 2013/0151491 A1* | 6/2013 | Gislason | G06F 17/30563 707/696 |
| 2016/0140137 A1* | 5/2016 | Konik | G06F 17/30289 707/692 |
| 2017/0166136 A1 | 4/2017 | Manicol | |
| 2017/0206199 A1 | 7/2017 | Umamageswaran | |

* cited by examiner

_(10)_ Patent No.: US 10,198,363 B2

REDUCING DATA I/O USING IN-MEMORY DATA STRUCTURES

BENEFIT CLAIM

This application claims the benefit under 35 USC § 119(e) of provisional applications 62/245,950, filed Oct. 23, 2015, the entire contents of which are hereby incorporated by reference for all purposes as if fully set forth herein. The applicant(s) hereby rescind any disclaimer of claim scope in the provisional application and advise the USPTO that the claims in this application may be broader than any claim in the provisional application.

TECHNICAL FIELD

The technical field relates to improvements in database management systems particularly to reducing data input/output (I/O) using in-memory data structures.

BACKGROUND

Querying data stored on storage disks may be computational heavy and time consuming. The query operations include scanning data on storage disks by reading out units of data and performing other operations such as joining, aggregating or filtering the scanned data based on predicates specified in the query. The scanning operation itself is generally time consuming due to slower access time for storage disk memory rather than operational volatile memory (such as RAM). For example, depending on storage disk technology, a read operation for disk storage memory may take up to 100 times longer than a read operation from operational memory.

Although incurring such high cost for a read operation, some of the read output data may be thrown away at a later stage of query processing. For example, a query may specify joins or predicates that effectively select a subset of the target data set of the query. However, to determine the subset, the full target data set is usually scanned and then filtered based on the computed or specified criteria. Thus, many rows of the target data set may be scanned, incurring the cost of reading operations from disk storage but then wastefully discarded for not matching the filtering criteria of the query.

One traditional solution to speed up read operations is to cache data of storage disks in operational memory (e.g. low latency memory such as non-volatile memory) when read from storage disks. Many techniques have been developed to optimize the caching to provide for maximum "cache hits" and minimize the necessity for accessing data on storage disks. However, in large data management systems such as a database management system (DBMS), it is almost impossible to avoid a cache miss for data requests because of the sheer size of data traffic. A DBMS that processes 1,000's of queries a second produces many cache misses as data is constantly swapped in and out of the cache.

Furthermore, using a large amount of operational memory for data cache decreases the performance of the system. The system uses operational memory for computational and data processing operations. However, as larger and larger portion of the memory is occupied by the data cache, lesser and lesser portions are available for computational and data processing operations. Thus, the operations will take longer time to execute degrading the performance of the whole system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
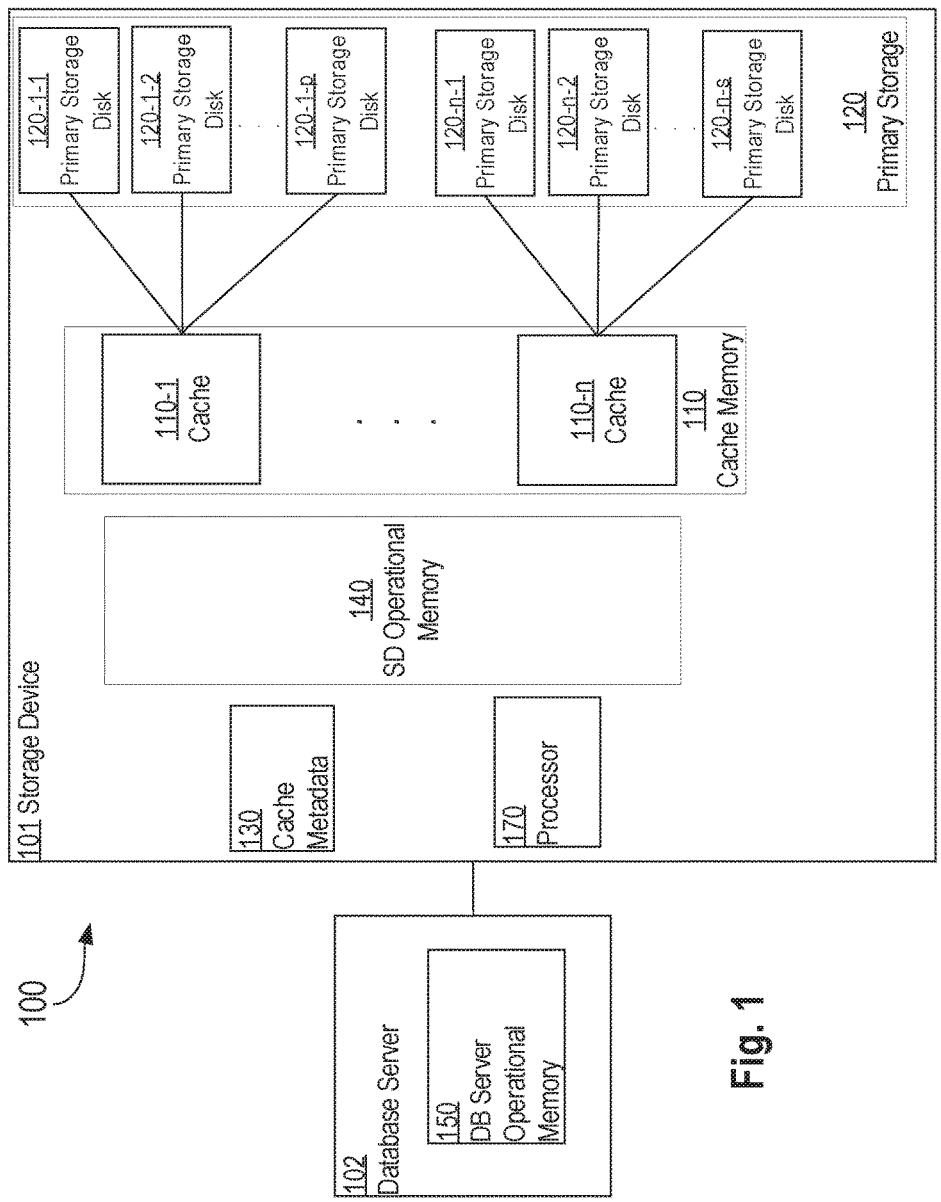
FIG. 1 is a block diagram that depicts a DBMS for processing filtering criteria based queries according to the maintained in-memory summaries, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for eliminating I/O operations for criteria based data scan. Using these techniques, a DBMS may skip over portions of a target data set in storage devices when performing a scan for a query that includes filtering criteria. Filtering criteria indicates one or more filtering columns of a target data set to be filtered based on one or more filtering values of the one or more filtering columns. The filtering criteria, when executed as part of the query, may filter the target data set based on existence or non-existence of the filtering value(s) in the corresponding filtering columns of the target data set. One example of how filtering criteria may be specified in a query is a "WHERE" clause with an equality predicate on a particular column for a particular value.

The smallest portion of data that a DBMS may read from and write to a storage device is a data block. Thus, a data block is an atomic unit of storage space allocated to store data for one or more database records (e.g., rows) or portions thereof. In an embodiment, a DBMS is configured to read and write database records from storage devices in units no smaller one or more data blocks, referred herein as a "data block set." Data blocks in a data block set may be contiguously arranged in the storage space or may be contiguously addressed in the storage space. In a DBMS, the data block set may be configured to be of a fixed size. When a record from a data block set needs to be retrieved for an operation, an entire data block set containing the record (or pertinent portion of thereof) may be requested and read into a buffer in operational memory for further processing. Such read I/O operation from the persistent storage where data block sets are stored, is relatively expensive and if performed frequently, may result in considerable delay in the execution of queries.

To avoid expensive I/O operations for reading data block sets, the DBMS maintains in the operational memory an in-memory summary, which is used to determine whether it is necessary to read a data block set for a query, in an embodiment. For example, the in-memory summary may contain information which the DMBS can use to determine that a particular value does not exist in the data block set summarized. Such information may be arranged and maintained by the DBMS in one or more data structures. Additionally or alternatively, the in-memory summary's data structures may also be used to affirmatively determine that the particular value indeed exists in the corresponding data block set.

The in-memory summary may contain multiple data structures for different columns of the summarized data block set. In an embodiment, a target data set of a query may contain multiple columns. If the in-memory summary does not exist yet for a particular data block set of the target data set, the multiple columns are evaluated to select one or more columns from the multiple columns to generate a corresponding in-memory data structure. The evaluation may be based on data statistics of an entire column of the target data set spanning multiple data block sets, and/or based of data statistics of a portion of the column within the particular data block set. Specifically, to make the selection of the one or more columns, the DBMS may use cardinality and read access statistics of the multiple columns of the target data set.

One technique to filter data block sets based on filtering criteria is for the in-memory summary of a data block set to contain the minimum and maximum value of a selected column in the data block set. This way, if a query is received by a DBMS with an equality predicate for a particular filtering value on the selected column, then the DBMS may first compare the particular filtering value with the in-memory summary of the data block set to determine whether the particular filtering value is within the maximum and the minimum. If the particular filtering value is outside the minimum and maximum value range, then the data block set may be skipped saving I/O operations for scanning the data block set.

The value range based filters, like the minimum and maximum filter, work well on column value sets that are minimally sorted or highly skewed. Unfortunately, there are many low cardinality columns with even distributions for which value range filters do not produce effective filtering. For example, a target data set may contain a column for denoting the US states for customers with values grouped by geographic location proximity of a corresponding state. Thus, the DBMS may determine that a 1 MB data block set of the target data set has a value range filter from "AZ" to "UT" (acronyms for the bordering US states). Although (based on geographic distribution) the data block set is unlikely to contain any value "RI" for the US state of Rhode Island, the DBMS, the DBMS performs a scan of the 1 MB data block set every time a query request specifies an "RI" customer.

In an embodiment, to improve on a value range filtering technique, a transformed value filtering technique is used. A data structure in an in-memory summary rather than containing minimum and maximum values of a column may contain values transformed from column values of a data block set. Each of the transformed values in the data structure approximately represents one or more unique values of the column in the data block set. This type of data structure is referred hereafter as an "in-memory data structure." A transformed value may be as small as a single bit or as large as (or event larger than) the original column value from which the transformed value is generated.

In an embodiment, to determine whether a value exists in a column of a data block set using an in-memory data structure, the value is similarly transformed into a transformed value. The transformed value is compared with the set membership of transformed values in the corresponding in-memory data structure. If the set membership of transformed values contains the newly transformed value, then the data block set may contain the value in the column, otherwise the data block set cannot possibly contain the value in the column. In addition to the transformed values of an in-memory data structures, the in-memory summary may contain metadata describing techniques used to generate the representations for the in-memory data structure.

In one embodiment, the approximate representation of the in-memory data structure is achieved using hash based techniques on data block set's values. The term "hashing" (or applying hash algorithm/function or a hash based technique) refers herein to a technique that transforms any length input data value, such as a column value, to a fixed length data value, referred to as a "hash value." When the same hash algorithm is used, the same input data values necessarily hash to the same hash values. The greater the length of produced hash values by a hash algorithm, the more accurately the hash algorithm ensures that different input data values produce different hash values, avoiding a "collision."

The term "collision" refers to generation of a same hash value from two different, non-equal, input data values. Collisions can be further avoided when the same input data value is hashed multiple times using different hash algorithms to yield multiple hash values, in an embodiment. When a new input data value is to be compared with previous input data values, the new input data value is hashed with the same multiple hash algorithms to yield new multiple hash values to be compared with the previous multiple hash values. The likelihood of collision to occur between the previous multiple hash values and the new hash value is substantially decreased. If the hash values indeed match, then it is substantially likely that the matched hash values were generated for the same input data values.

In an embodiment, the DBMS uses hash values generated from a column of a data block set as a representation of unique values in the column of the data block set. The term "hash identifier" refers to one or more hash value that identify a particular column value in a data block set. In-memory data structure for the particular column may store hash identifiers of values in the column of the data block set. Such type of in-memory data structure is referred herein as a "dictionary." The DBMS uses the dictionary during the processing of a query to determine whether a filtering value of the query exists in the data block set of the dictionary. The filtering value is similarly hashed and compared to hash identifiers in the dictionary. If one or more hash identifiers in the in-memory data structure match the hashed filtering value, then the data block set most likely contains the filtering value and needs to be read into operational memory. Otherwise, the data block set is skipped saving the DBMS computing resources.

In another embodiment, a cryptographic strength hash algorithm is used to generate a more accurate hash value from a column value of the selected column. The in-memory data structure for the selected column of the data block set is then modified based on the two or more portions ("sub-hashes") of the generated hash value. Using a single hash algorithm to generate multiple sub-hashes removes the need for generating multiple hashes using different algorithms in order to improve accuracy. The sub-hashes obtained from statistically independent portions of a generated cryptographic hash may confer the same benefit of accuracy as the multiple different hashes, without the need of multiple separate hashing of a same column value. Each sub-hash of a hash value may be treated by the DBMS as a separate hash identifier of the column value. Since hashing is resource heavy operation, using a single hashing for each value significantly reduces the resource utilization of the DBMS without compromising the in-memory summary's accuracy.

In an embodiment, few bits may be used to represent each column value of a data block set. Although, fewer bits increase the rate of collisions, the in-memory data structure with fewer bit representations are much smaller. Accordingly, the memory space that in-memory summaries occupy is lesser, and the available memory space for the DBMS to execute workloads using the operational memory is greater.

In an embodiment, the in-memory data structure used for identifying column values of a data block set is a "dense bloom filter." A dense bloom filter is a bit array data structure in which one or more set bits probabilistically represent whether an element is a member of a set, i.e. an existence of a particular data value in a set of data values of a data block set. As used herein, a dense bloom filter is a bloom filter that uses a relatively small number of bits to probabilistically represent each unique value. For example, according to one embodiment, the entire bit array of the dense bloom filter for the selected column of a data block set has only four times the number of bits as the cardinality of the selected column, whereas conventional bloom filters typically use 12-16 times the number of bits. Stated differently, in such a dense bloom filter, each unique value of the selected column in a data block set may be represented by four bits in the bit array of the dense bloom filter.

System Architecture

In-memory summaries may be maintained in any fast access memory storage of a DBMS, generally referred herein as "operational memory." FIG. 1 is a block diagram that depicts a DBMS, DBMS 100, for processing filtering criteria based queries according to the maintained in-memory summaries, in an embodiment. DBMS 100 comprises a storage device 101 and a database server 102. For the purpose of explanation, FIG. 1 depicts one storage device 101 and one database server 102; however, various embodiments may include any number of storage devices 101 and any number of database servers 102.

In an embodiment, a storage device 101 comprises operational memory 140, cache memory 110, primary storage devices 120, cache metadata 130 and one or more processors 170. Cache memory 110 may include caches 110-1 . . . 110-$n$, and primary storage 120 may include primary storage devices 120-1-1 . . . 120-$n$-$s$. Each cache 110 serves as a cache for a particular set of primary storage devices 120. For example, cache 110-1 serves as a cache for primary storage devices 120-1-1 . . . 120-1-1-$p$, while cache 110-$n$ serves as a cache for primary storage devices 120-$n$-1 . . . 120-$n$-$s$.

Cache memory 110 and primary storage 120 may be implemented as non-volatile memory devices, while operational memory 140 may be implemented as volatile memory. In an embodiment, cache memory 110 and operational memory 140 are implemented as fast-access memory devices, while primary storage 120 is implemented as a slow-access memory device. Hence, cache memory 110 or operational memory 140 may be configured to provide access to data faster than primary storage 120 and thus maintain in-memory summaries for data block sets described below, in some embodiments.

Implementations of cache memory 110 may vary. For example, a cache 110 may be implemented as a flash memory device, also referred to as flash cache. In the description below, the references to cache memory 110 indicate flash cache. Cache memory 110 may be a small, high-speed magnetic disk drive connected to a larger low-speed magnetic disk device such as a primary storage device 120.

In an embodiment, cache memory 110 may be volatile and part of SD operational memory 140. Additionally, operational memory 140 may be configured to store temporary data necessary for processor 170 to execute instructions. SD operational memory 140 may be a random access memory such as SDRAM or DRAM.

Database server 102 may be configured to communicate with storage device 101 and to execute queries from client applications. Database server 102 comprises operational memory 150 for storing temporary data needed for executing instructions by database server 102. An example of a database server 102 is a multi-node database server, with each node running an instance of a database server and having shared access to storage device 101. Database server 102 may be configured to request data from storage device 101, receive data from storage device 101, send data to storage device 101, and otherwise communicate with storage device 101.

A storage device 101 is configured to manage receiving, storing and retrieving data. Storage device 101 may receive requests from database server 102. For example, storage device 101 may receive a request from database server 102 to retrieve a particular data block set, a set of data block sets and/or data block sets for the target data set specified in the request from either primary storage 120 or cache memory 110.

In an embodiment, storage device 101 provides a client (such as database server 102) access to read or write data block sets stored in persistent storage 120. Clients retrieve data block sets from storage device 101 by issuing block requests to storage device 101. To support reading from and writing to storage device 101, data stored in primary storage 120 is organized in data block sets. A data block set may have an associated data block set address, which uniquely identifies the data block set and the data block set location within primary storage 120.

In managing data storage, storage device 101 may utilize metadata stored in each data block set, referred to herein as data block set metadata. The data block set metadata within a data block set may, for example, indicate where each column within the data block set begins. In addition, the data block set metadata may contain control information for database transactions, and a token table used for compressing the data block set.

Storage in cache memory 110 may also be organized by data block sets. As copies of various data block sets are read from primary storage 120, the copied data block sets may be stored in cache memory 110.

Cache memory usually has smaller storage capacity than primary storage. Hence, the quantity of cached copies of data block sets in cache memory 110 is usually smaller than the quantity of data block sets stored in primary storage 120.

Storage device 101 tracks the data block sets that have been copied from primary storage 120 to cache memory 110, and stores metadata, within cache metadata 130, that reflects the mapping between the primary storage device blocks and the copies of data block sets in cache memory 110.

Storage device 101 is configured to provide filtered and unfiltered data block sets to database server 102, in an embodiment. Storage device 101 may perform filtering of the data by skipping data block sets based on filtering criteria provided by database server 102. Storage device 101 may be equipped with modules configured to determine compression formats, evaluate costs associated with sending data to the storage server, and perform selectivity of each predicate.

Selecting Data Block Set for in-Memory Summary

In-memory summaries for data block sets may be maintained either by storage device 101 or by database server 102 in their respective instances of operational memory. Since the operational memory is relatively smaller in size than disk storage, it may not be possible for all data block sets in storage devices of DBMS 100 to have respective in-memory summaries in the operation memory. Additionally or alternatively, the memory allocated to in-memory summaries may not have sufficient space for all columns in a data block set to have respective in-memory data structures. Therefore, DBMS may selectively generate in-memory summaries for only a portion of data block sets and in-memory data structures for only a portion of columns of the selected portion of data block sets.

Figure 2:
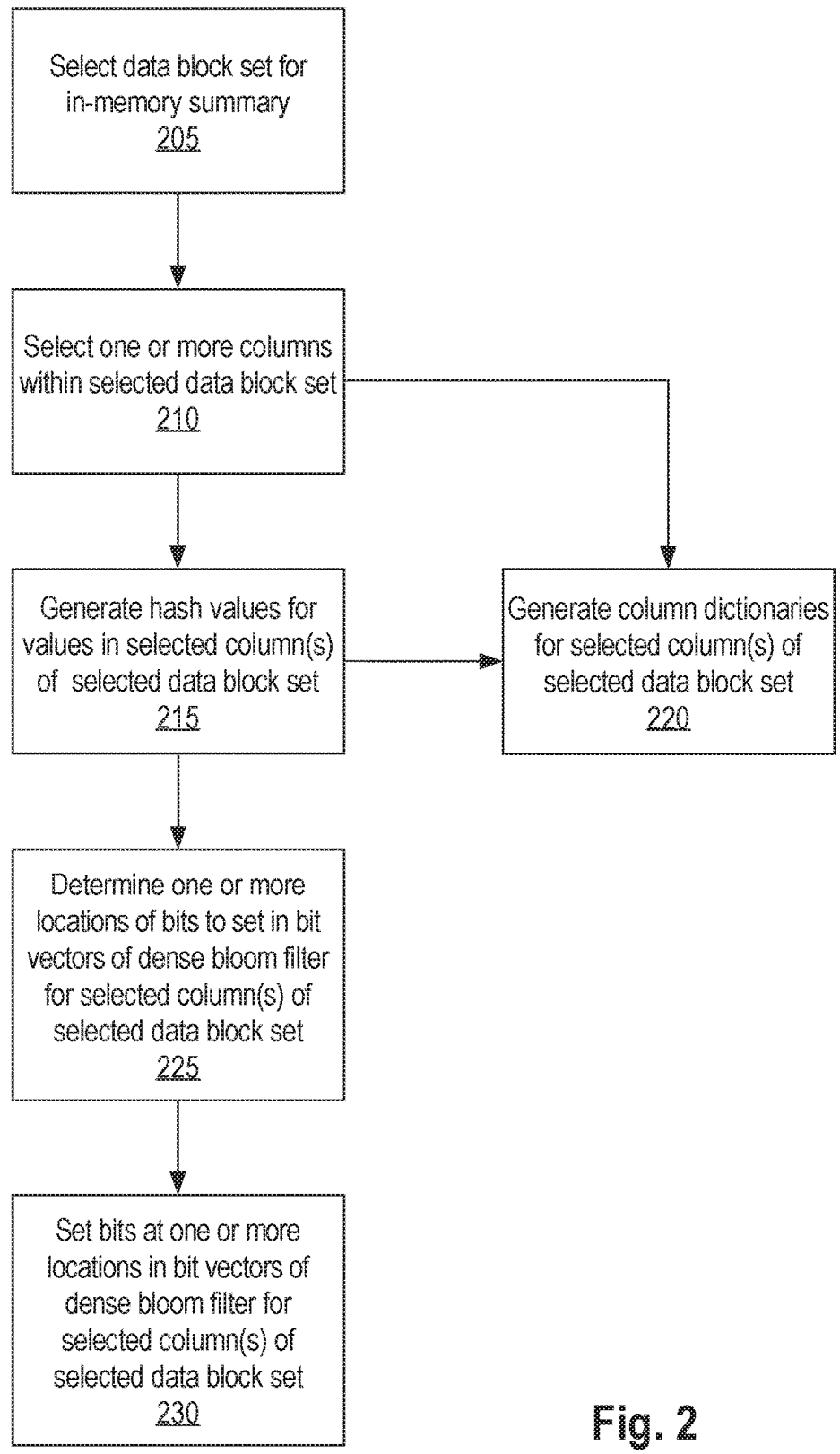
FIG. 2 is a flow diagram that depicts generating in-memory summaries for data block sets, in an embodiment.

FIG. 2 is a flow diagram that depicts generating in-memory summaries for data block sets, in an embodiment. At block 205, DBMS 100 selects a data block set for which to generate an in-memory summary. The data block set is selected when DBMS 100 executes a query targeted to a data set which is in part stored in the data block set. As part of the query execution, DBMS 100 scans the data block sets that store the target data set but have no in-memory summary. As DBMS 100 computes the result set, DBMS 100 may determine that only a portion of the scanned data block sets for the query contain the data necessary for the result set. The data block sets that are not used for the result set may automatically qualify for in-memory summaries to ensure that the next similar query would not scan and discard these data block sets again wasting computing resources.

For example, the query may contain filtering criteria in a form of an equality predicate on a filtering column of a table for a particular filtering data value. To evaluate the predicate, DBMS 100 scans all the data block sets that contain the column and evaluates the predicate on the filtering column values in each of the data block sets. If none of the rows in a particular data block set have the particular filtering predicate value, that particular data block set, although retrieved (scanned from the storage device) is not used in the query execution.

Data block sets that are scanned for a query execution but are not used due to failing to satisfy filtering criteria of the query automatically qualify to be selected for respective in-memory summaries at block 205 of FIG. 2, in an embodiment. As more and more queries are executed by DBMS 100, more and more data block sets are identified for generation of respective in-memory summaries. Since in-memory summaries are stored in operational memory which has limited memory space, the total size of in-memory summaries may exceed the allocated space in the operational memory, particularly if for every data block set skipped in any query execution an in-memory summary is generated.

To reduce the number of in-memory summaries, additionally or alternatively, DBMS 100 may maintain data statistics indicating frequency of a data block set being scanned yet not used by a query, a "skip rate" of a data block set. The skip rate of a data block set may qualify or disqualify the data block set for an in-memory summary to be generated at block 205. For example, if a query execution has skipped over a data block set but the data block set's skip rate is low (not meeting a predetermined threshold for the skip rate), then the in-memory summary is not generated for the data block set. On the other hand, if an in-memory summary generation was triggered for a data block set that had high skip rate, then the in-memory generation would proceed for the data block set.

In an embodiment, an in-memory summary for a data block set is of a fixed memory size. With a fixed memory size in-memory summary, in some cases, DBMS 100 may not be able to generate in-memory data structures for all columns in the selected data block set that are used for filtering criteria in one or more queries. At block 210, one or more columns are selected from the selected data block set for generating respective in-memory data structures. DBMS 100 may select the columns based on their respective data statistics that include: cardinality of column values, cardinality of column values in the selected data block set, and/or frequency of column's use in filtering criteria of queries. For example, if a particular column has lower cardinality, i.e. less distinct values, than another column in filtering criteria, then the particular column is selected for in-memory data structure generation.

In an embodiment, data statistics for data block sets and columns is collected and stored prior to initiating the generation of in-memory data structures. At the time of the generation, DBMS 100 retrieves the stored data statistics and uses the statistics to select which one or more columns to create an in-memory data structure from the selected data block set. The retrieved data statistics may have been collected at the time of insertion or deletion of values from the columns, or a separate process may periodically evaluate the columns to update the data statistics of the columns. In another embodiment, if the data statistics does not already exist, DBMS 100 collects the data statistics when triggered for generating an in-memory summary for the selected data block set.

Generating Dictionary Data Structure for Selected Column in Data Block Set

At block 220, DBMS 100 stores unique values of a selected column in the selected data block set in a value-based dictionary data structure of the in-memory summary, in an embodiment. Based on the cardinality of the selected column, DBMS 100 may determine that all unique column values of the selected column may be stored within the memory space of the in-memory summary of the selected data block set. Once stored in the dictionary data structure, DBMS 100 may lookup query predicate values for the selected column in the dictionary data structure of the in-memory summary to determine whether to retrieve the selected data block set.

In an embodiment, the value-based dictionary data structure for the selected column is a vector of unique column values. The vector may also store the size information of each element storing a unique column value. In an embodiment, where column values are of the same size, the vector may store one size information for all elements of the vector. For example, for a selected column that contains the "MA,"

"RI," "CT," "NY," "ME," "NH," and "VT" values in a selected data block set, the value-based dictionary vector for the data block set may contain "222222MARICTNYMENHVT", in which the values of "2" represent each unique column value size in bytes in the vector. If the selected column of the example contains all two-bytes values, the vector may be further simplified to store only a single value for the size, thus may contain the "2MARICTNYMENHVT" vector in the in-memory summary for the selected data block set.

In an alternative embodiment, rather than storing actual unique column values of a selected column in an in-memory summary for a selected data block set, DBMS 100 uses hash identifiers of column values in a selected column to represent unique column values. At block 215 of FIG. 2, DBMS 100 applies hash algorithm values of selected columns in the selected data block set, in an embodiment. The application of the hash algorithm generates hash identifiers from the column values, which may be stored in a hash-based dictionary data structure at block 220. The dictionary data structure may arrange the generated hash identifiers in such a way that each of them maps to the unique data value of the selected column in the selected data block set from which the hash identifier is generated. Thus, the dictionary data structure may create a mapping between unique data value in the selected data block set and the corresponding hash identifier. In another embodiment, to save space for the in-memory summary, the dictionary data structure may contain only the unique hash values of data values of the selected column.

Using, such a hash-based dictionary data structure, DBMS 100 may efficiently evaluate an existence of a data value in the selected column, particularly if the data values of the column are larger than a size of the resulting hash identifiers. Accordingly, the hash-based dictionary storing hash identifiers would occupy smaller memory space in an in-memory summary than the value-based dictionary data structure storing unique actual data values of the selected column. Additionally, DBMS 100 may efficiently evaluate an existence of a data value in the selected column of the selected data block set without any data value type specific processing. For example, a lookup value can be hashed using the same hash algorithm and the generated hash value can then be compared with the hash identifiers already in the dictionary. If the generated hash value fails to match, then the look up value definitively does not exist in the selected column of the selected data block set. On the other hand, if the generated hash value matches the hash identifiers, then the look up value exists in the selected column of the selected data block set with a degree of certainty proportional to the collision probability of the hash algorithm.

In a related embodiment, a cryptographic strength hash function is used to decrease the collision probability of generated hash values for the selected data block set column. The cryptographic strength hash function generates hash values that contain two or more statistically independent sub-hash values. The statistically independent sub-hash values have bit values that has no or minimal dependence on how the bit values from the other sub-hash value are generated by the hash function. An example of a cryptographic hash function that can produce a hash value with statistically independent sub-hash values, is a Jenkins hash function. The least significant bits of Jenkins hash value are statistically independent from the most significant bits of the same Jenkins hash value. Each of such sub-hashes or the full cryptographic hash may then be treated by DBMS 100 as a hash identifier of a column value that is generated based on a different hash algorithm. Using a cryptographic strength hash function that generates multiple hash identifiers achieves the same benefit as hashing the column value with two different hash functions. The hash-based dictionary for a data block set may index unique column values using the full cryptographic strength hash identifiers or a hash identifier from a sub-hash of the full cryptographic hash value. The number of hash identifiers used as well as the number of hash functions used may depend on the configuration of DBMS 100. However, using more than one hash identifier to represent a unique column value may increase the size of the dictionary for the column of a data block set.

Since the in-memory summary of a data block set has limited memory space, DBMS 100, at block 220 of FIG. 2, has to ensure that the generated hash-based dictionary fits within the limited memory space of the in-memory summary. Apart from the number of hash identifiers used per each column value, the size of the dictionary also depends on the cardinality of the selected column. If the cardinality is low, then a lesser number of hash identifiers are generated, and thus, the generated dictionary has lesser entries and is of a smaller size. Columns of certain data types have typically lower cardinality in a data block set, in an embodiment. For example, values of date-time data type that represent datetime stamps in a column, are generally stored in temporal arrangement. Thus, although the column may contain a diverse set of date values that span over many years, a particular data block set may have a homogenous data set of values that spans only few days which would correspond to few unique values. Such a homogenous data set may generate a hash-based dictionary data structure that contains only few hash identifiers and would most likely fit in the allocated memory of the in-memory summary.

Additionally, the size of the hash-based dictionary data structure depends on the size of a hash identifier generated by the hash algorithm. In an embodiment, based on the cardinality of data values in the selected data block set for the selected column, DBMS 100 may determine to hash (or re-hash) the data values using a different hash identifier size and/or reduce a number of hash identifiers per value to meet the size requirements of the in-memory summary of the selected data block set. For example, if based on the number of unique values in the selected column of the selected data block set, DBMS 100 determines that 256-bit hash identifiers exceed the space requirements of the in-memory summary allocated memory space, DBMS 100 may apply hash algorithm that generates smaller hash identifiers. For example, to reduce the dictionary size roughly by half, DBMS 100 may use 128-bit hash identifiers instead of 256-bit hash identifiers. Although the dictionary size would be reduced, such a reduction in the length of the generated hash identifiers may increase the number of collisions and thus, false positives.

Generating Dense Bloom Filter Data Structure for Selected Column in Data Block Set If the selected data block set has a high cardinality of values for the selected column, a dictionary representing unique values may exceed the allocated space of the corresponding in-memory summary, or the accuracy of the dictionary representation (due to lesser length hash identifiers) may be insufficient. Accordingly, DBMS 100 may generate a more compact in-memory data structure such as a dense bloom filter for the selected column. The dense bloom filter contains a bit vector in which a bit at a particular location of the vector represents an existence or non-existence of a particular value in a data block set for the selected column.

In one embodiment, the allocated space for a bit vector of an in-memory summary is of fixed size. In another embodiment, the size of the bit vector of the dense bloom filter may vary from one data block set's in-memory summary to another. The variance in size may be based on the available memory space and/or cardinality of values in the selected column or in the selected column for the selected data block set.

Figure 3:
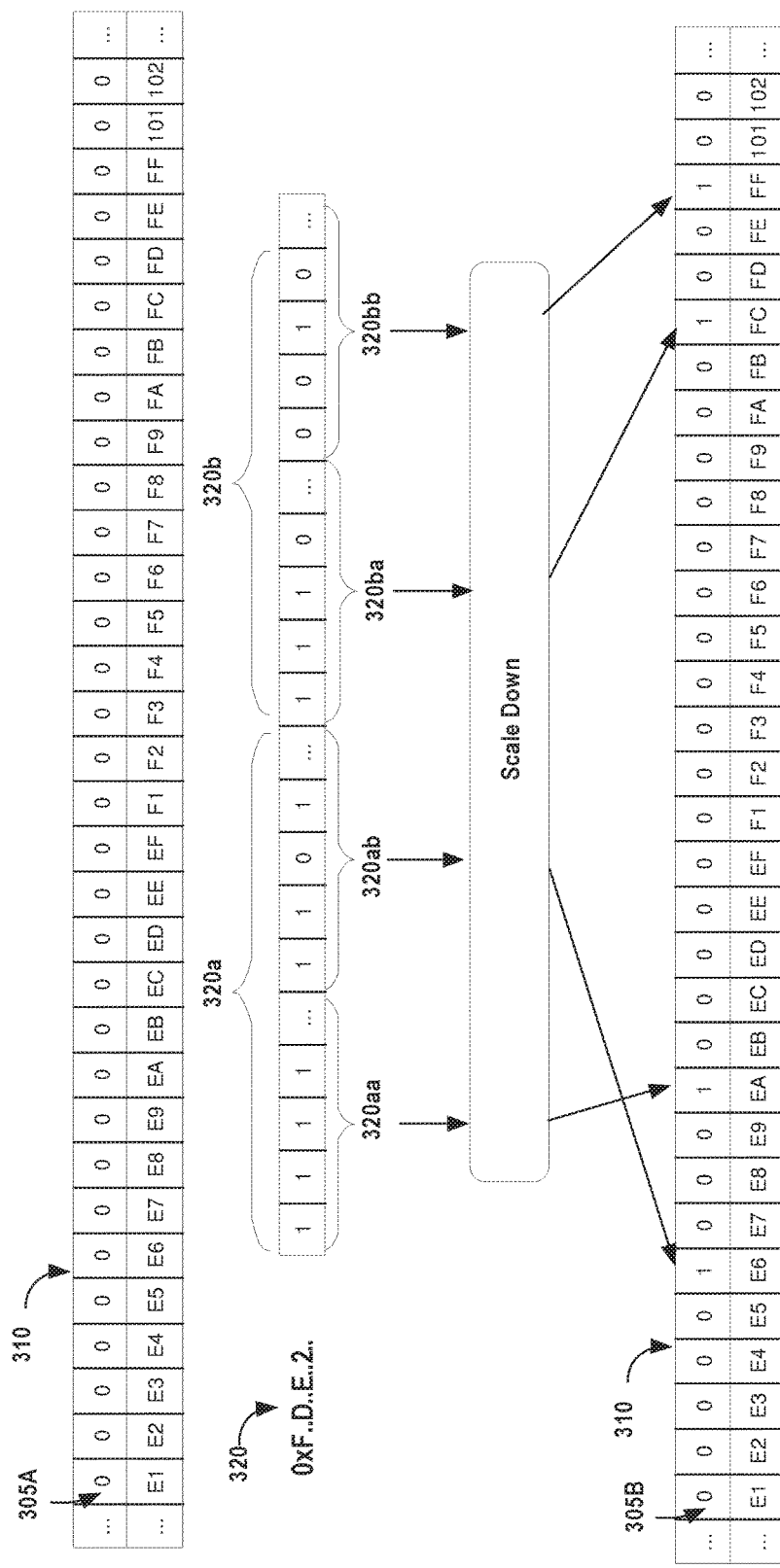
FIG. 3 is a block diagram that illustrates a process for generating a dense bloom filter data structure, in an embodiment.

FIG. 3 is a block diagram that illustrates a process for generating a dense bloom filter data structure, in an embodiment. To generate the dense bloom filter, DBMS 100 may initialize the bit vector of the dense bloom filter by resetting all the bits. For example, DBMS 100 may zero out all the bits in the allocated space for the bit vector such as bit locations 305A of bit vector 310 as depicted in FIG. 3. As hash identifiers are generated from column values of the selected data block set, the corresponding bits of the bit vectors may be set.

In an embodiment, each unique value in the selected column of the selected data block set may be represented by one or more bits being set in the bit vector. The number of bits that represents each value in the bit vector depends on the cardinality of the values in the selected column, or more precisely, on the cardinality of values in the selected column in the selected data block set. For example, DBMS 100 may allocate 100 bytes of in-memory data structure for the selected column for each 1 MB data block set. Such allocation would result in a bit vector with a length of 800 bits. If the cardinality of the selected column indicates 400 unique values, then each possible unique value would be densely represented by 2 bits. In another example, if the cardinality of the data block set for the selected column is available and indicates 200 unique values, then, each possible unique value would be densely represented by 4 bits, respectively.

To represent each column value inside the bit vector, DBMS 100 uses hash identifiers from each value in the selected column of the selected data block set, in an embodiment. The hash identifiers may have been generated at block 215 of FIG. 2. If a hash-based dictionary for the selected column has been generated at block 220, DBMS 100 may re-use the cryptographic hash identifiers in the dictionary for determining the bits to be set in the bit vector.

In an embodiment, DBMS 100 uses hash identifiers based on cryptographic hash function for the bit vector. If the previously generated hash identifiers are not based on a cryptographic function, DBMS 100 applies a cryptographic hash function to column values from the selected data block set to produce a single hash value containing multiple hash identifiers. Using the multiple hash identifiers, DBMS 100 may set different bits in the bit vector decreasing the probability of collision. DBMS 100 may be pre-configured to use a particular number of hash identifiers and portions from a hash value or may use configuration data to extract the information.

In another embodiment, DBMS 100 may hash the data block set value more than once using a different algorithm each time. The usage of different algorithms increases the accuracy of the bit vector representation as described above, however comes at the extra cost of hashing each data block set value more than once. In such an embodiment, DBMS 100 may use the hash identifiers for the selected block generated for the hash-based dictionary, at block 220 of FIG. 2, in addition to generating another set of hash identifiers for the selected data block set with a new hash function that is different than the one used for the dictionary hash identifiers.

At block 225, DBMS 100 scales down each hash identifier for a column value to one or more locations in the bit vector. In an embodiment, if the dense bloom filter uses more than one location per hash identifier, than the hash identifier is divided into the same number of portions as the number of locations, and each portion is scaled down to a particular location. DBMS 100 may scale down any portion of a hash identifier to a location using various bit operations. The exact techniques used for scaling down a portion to a location in the bit vector is not critical to the techniques described herein. For example, one way to scale down is to perform a modulo operation on the portion of the hash identifier with the total number of locations in the bit vector. The output of the modulo is the location of the bit in the bit vector that DBMS 100 sets. Other techniques may be used such as bit masking or bit shifting to produce a location within the bit vector. In another embodiment, if the dense bloom filter uses more than one location per hash identifier, the scale down itself may produce more than one location. For example, if the bit vector has 256 bit locations and two locations allocated per unique value, the scale down may produce a 512-bit rather than 256-bit result. The result could be divided into two 256-bit address portions for the location of the two bits in the bit vector. In another example, two different scale down algorithms may be used to produce two 256 bit results for identifying the two bits corresponding to the hash identifier.

At block 230, DBMS 100 sets bits of the bit vector at the locations determined as the result of the scale down at block 225. Once DBMS 100 processes all the values of the selected column in the selected data block set using the process depicted in FIG. 2, the dense bloom filter's bit vector contains the full representation of the unique values of the selected column in the selected data block set.

Continuing with the example of FIG. 3, DBMS 100 retrieves a particular value from the selected column in the selected data block set. Using a Jenkins hash algorithm, the particular value may be hashed to result in 256-bit hash identifier 320 (0xF . . . D . . . E . . . 2 . . . where the multiple dots denote other hexadecimals of the hash identifiers which are omitted for brevity). Since a cryptographic strength hash algorithm is used, most significant bits 320*a* are statistically independent from least significant bits 320*b*, and each may serve as a separate hash identifier for the particular value. Based on the cardinality of the selected column, DBMS 100 has allocated 4 bits per unique value of the selected column to be set at bit locations 305B in initialized dense bloom filter's bit vector 310. Because there are 4 bits available to be set for the particular value, each hash identifier is further divided into two portions: hash identifier 320*a* into hash identifier portions 320*aa* and 320*ab* and hash identifier 320*b* into hash identifier portions 320*ba* and 320*bb*. Each of these portions are scaled down to an address in bit vector 310. Hash identifier portion 320*aa* scales down to the location of 0xEA in bit vector 310, hash identifier portion 320*ab* to the location of 0xE6, hash identifier portion 320*ba* to the location of 0xFC, hash identifier portion 320*ab* to the location of 0xFF. DBMS 100 then sets the bits at all those locations to 1 denoting that the selected data block set contains the particular value in the selected column.

In some embodiments, in addition to in-memory summaries for the one or more selected columns of the selected blocks, DBMS 100 may store metadata about the generated in-memory summaries. For example, the metadata may describe whether an in-memory data structure is a dense bloom filter or a dictionary, a type of dictionary (value-based or hash based), the name and type of a hash algorithm (length of hash identifiers), size of a bit vector, number and methodology for generating hash identifiers from a hash value, number and methodology for dividing hash identifiers into portions, scaling down methodology used, and/or number of bits allocated for each unique value in a bit vector. The metadata may describe this information for all in-memory summaries with DBMS 100 or per each in-memory summary or per each in-memory data structure within an in-memory summary.

Maintaining in-Memory Summaries of Data Block Sets

In an embodiment, storage device 101 may maintain in-memory summaries of data block sets in a cache memory 110 or SD operational memory 140. Upon a scan request from database server 102, storage device 101 retrieves zero or more data block sets requested by a storage server client. The request may specify a target data set and one or more filtering criteria issued by database server 102. In response, storage device 101 maps the target data set to ranges of data block sets to be retrieved. Before retrieving the data block sets, storage device 101 retrieves in-memory summaries for the range of data block sets. Using the in-memory summaries and based on the techniques discussed in the section below, storage device 101 determines whether to skip retrieving one or more of the data block sets from persistent storage 120.

Alternative or in addition to storage device 101, database server 102 maintains the in-memory summaries for data block sets within its own operational memory 150. Database server 102 itself determines the set of blocks that correspond to the target data set and analyzes those data block sets' in-memory summaries. Using these in-memory summaries and based on techniques discussed in the section below, database server 102 determines whether to skip requesting storage device 101 to retrieving one or more of the data block sets.

Determining Data Block Sets to Skip

Based on a received query, DBMS 100 determines the target data set to be scanned. However, the query may contain filtering criteria, such as predicate, that selects only a subset of rows of the target data set. Since the target data set may be stored in multiple data block sets, one or more data block sets of the target data set may contain none of the rows in the subset. These data block sets may contain only rows of the target data set that are to be filtered out from the query results based on the filtering criteria. To save I/O operations, DBMS 100 may utilize in-memory summaries of data block sets to select only a subset of data block sets that are more likely to have at least one row that qualifies the filtering criteria and to skip the data block sets that certainly will fail.

Figure 4:
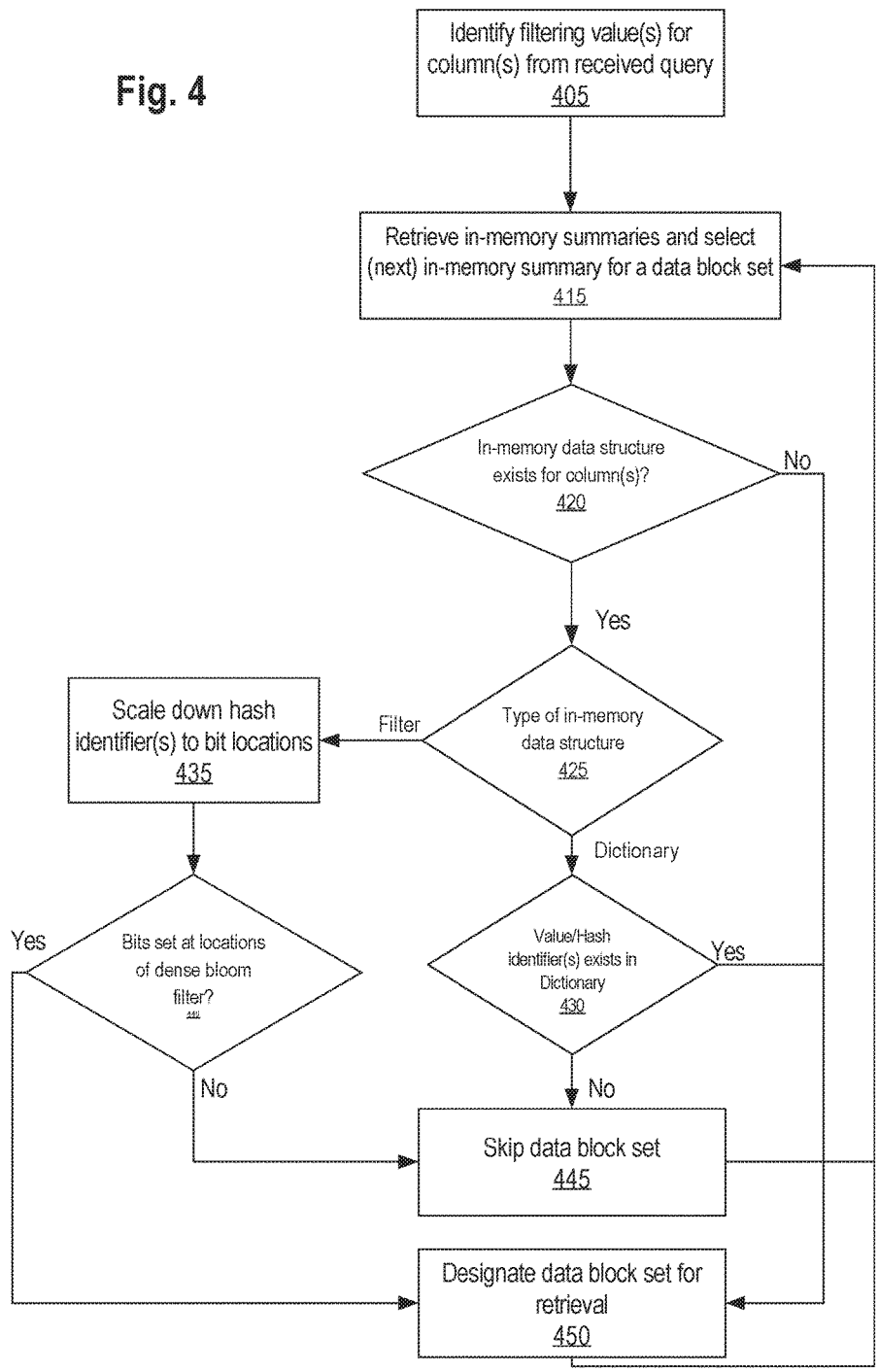
FIG. 4 is a flow diagram that depicts a process for determining data block sets corresponding to a target data set that may be skipped, in an embodiment.

FIG. 4 is a flow diagram that depicts a process for determining data block sets corresponding to a target data set that may be skipped, in an embodiment. At block 405, DBMS 100 identifies in the query the columns and corresponding values on which the filtering criteria is based. If more than one column or more than one value is specified for the filtering criteria, DBMS 100 determines which conditions on non-existence of value(s) in a data block set need to be satisfied for the data block set to be skipped. For example, if the filtering condition in a query is a predicate "WHERE STATE IN ('CA', 'NV')", then in order for a data block set to be skipped, the "STATE" column of the data block set should not have the value of 'CA' in the data block set, and additionally, should not have the value of 'NV' in the same data block set. On the other hand, if for example, the filtering condition in a query is a predicate "WHERE STATE='CA' AND CITY='San Francisco'", then for a data block set to be skipped either the STATE column in the data block set should not have value 'CA', or the CITY column in the data block set should not have value 'San Francisco'. If any of these two conditions are satisfied, the data block set can be skipped.

At block 415, DBMS 100 retrieves in-memory summaries for target data block sets corresponding to the target data set and iterates through them, in an embodiment. In some embodiments, only a subset of the data block sets has each respective in-memory summary retrieved and processed by DBMS 100. For example, if a data block set is already loaded into fast access memory, there may not be a need to determine whether to access this data block set. Read I/O operations for scanning data block sets already in fast access memory do not incur prohibitive processing costs for DBMS 100, and thus, DBMS 100 may not need to spend computing resources on processing in-memory summaries for such data block sets. Accordingly, in-memory summaries for data block sets in DB Server Operation Memory 150, SD Operational Memory 140, or Cache Memory 110 may be skipped and those data block sets are marked for retrieval regardless of their respective in-memory summaries.

For the data block sets for which the respective in-memory summaries are retrieved, DBMS 100 executes blocks 420-450 for each of the in-memory summaries.

At block 420, for a retrieved in-memory summary, DBMS 100 determines whether any of the filtering column(s) of the query has a corresponding in-memory data structures in the selected in-memory summary. If not, then DBMS 100 cannot make any determination whether to skip the data block set corresponding to the in-memory summary, and the process proceeds to block 450 at which the data block set is marked for the necessary retrieval from the persistent storage.

However, if at block 420, DBMS 100 finds one or more in-memory data structures corresponding to the filtering column(s) in the filtering criteria, DBMS 100 proceeds to block 425 to evaluate the in-memory data structures that correspond to the filtering columns in the query.

In an embodiment, at block 425, DBMS 100 determines whether each of filtering columns' in-memory data structures is a dense bloom filter, a value-based dictionary or a hash-based dictionary by examining the data structure or by querying metadata. The execution of block 425 may be skipped, if DBMS 100 has pre-configured knowledge of the type of data structure used for in-memory summaries managed by DBMS 100.

At block 430, if the in-memory data structure for a filtering column is a value-based dictionary, one or more filtering values are compared with the unique values in the dictionary. DBMS 100 checks whether the filtering value(s) of the filtering column exist in the dictionary. If the filtering values do not exist in the dictionary and such non-existence evaluates to failing to satisfy the filtering criteria of the query, the process transitions to block 445. The data block set corresponding to the in-memory summary for which the in-memory data structure was evaluated, is marked to be skipped in the retrieval operation at block 445.

However, if at block 430, the filtering values are matched to values in the dictionary of the in-memory summary for the data block set, and this matching evaluates to satisfy the filtering criteria of the query, the data block set is marked for retrieval at block 450.

In an embodiment, in which DBMS 100 determines that the type of the in-memory data structure of the filtering column is a hash-based dictionary or a dense bloom filter, DBMS 100 generates hash identifiers of the filtering values. DBMS 100 applies the same one or more hash functions as used for the generation of the in-memory summaries of the data block sets to the filtering value(s). DBMS 100 may be pre-configured to use the same one or more hash functions as the hash functions used in the generation of the in-memory summary. In another embodiment, DBMS 100 determines the hash functions from examining the metadata stored during the generation of in-memory summaries.

At block 430, if the in-memory data structure is a hash-based dictionary, the generated one or more hash identifiers for the filtering values are compared with the hash identifiers in the dictionary. If the hash identifiers do not exist in the dictionary and such non-existence evaluates to failing to satisfy the filtering criteria of the query, the process transitions to block 445. The data block set corresponding to the in-memory summary for which the in-memory data structure was evaluated, is marked to be skipped in the retrieval operation at block 445.

However, if at block 430, the hash identifiers for the filtering values exist in the dictionary of the filtering column in the in-memory summary for the data block set, and this existence evaluates to satisfy the filtering criteria of the query, the data block set is marked for retrieval at block 450.

At block 435, if the in-memory data structure is a dense bloom filter, then the generated hash identifiers for the filtering value(s) are scaled down to one or more bit locations. The filtering values are scaled down using the same techniques as used in the generation of the dense bloom filter. The scale down techniques may be preconfigured or retrieved from the metadata.

At block 440, DBMS 100 evaluates whether at least one bit in the dense bloom filter is not set at the bit locations determined by the scale down of the hash identifier(s). If such a bit is not set, then the corresponding filtering value fails to exist in the data block set. The non-existence of the filtering value(s) may evaluate as failing to satisfy the filtering criteria of the query, the process transitions to block 445. For example, if the filtering value is a part of a necessary equality predicate, then the non-existence of the filtering value evaluates the data block set as failing to satisfy a filtering criteria. The data block set corresponding to the in-memory summary for which the in-memory data structure was evaluated, is designated to be skipped at block 445 and thus, may not be retrieved.

In another embodiment, multiple filtering values need to be evaluated in order to evaluate the filtering criteria of the data block set for the query. In such an embodiment, until all the filtering values are not evaluated to fail to exist in the data block set, DBMS 100 does not designate the data block set from filtering at block 445. For example, if the predicate in the query is based on an alternative equality of values (such as multiple alternative values equated to one or more filtering column or multiple alternative equality predicates), then DBMS 100 designates the data block set to be skipped only after each alternative filtering value is processed according to FIG. 4 flow diagram.

On the other hand, if at block 440, the bit locations for hash identifier(s) for the filtering value(s) are all set in the bit vector of the dense bloom filter for the data block set, and such existence evaluates to satisfy the filtering criteria of the query, the data block set is marked for retrieval at block 450.

DBMS 100 does not scan data block sets for the target data set that are designated to be skipped and thus, saves I/O operations for retrieving the data block sets.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
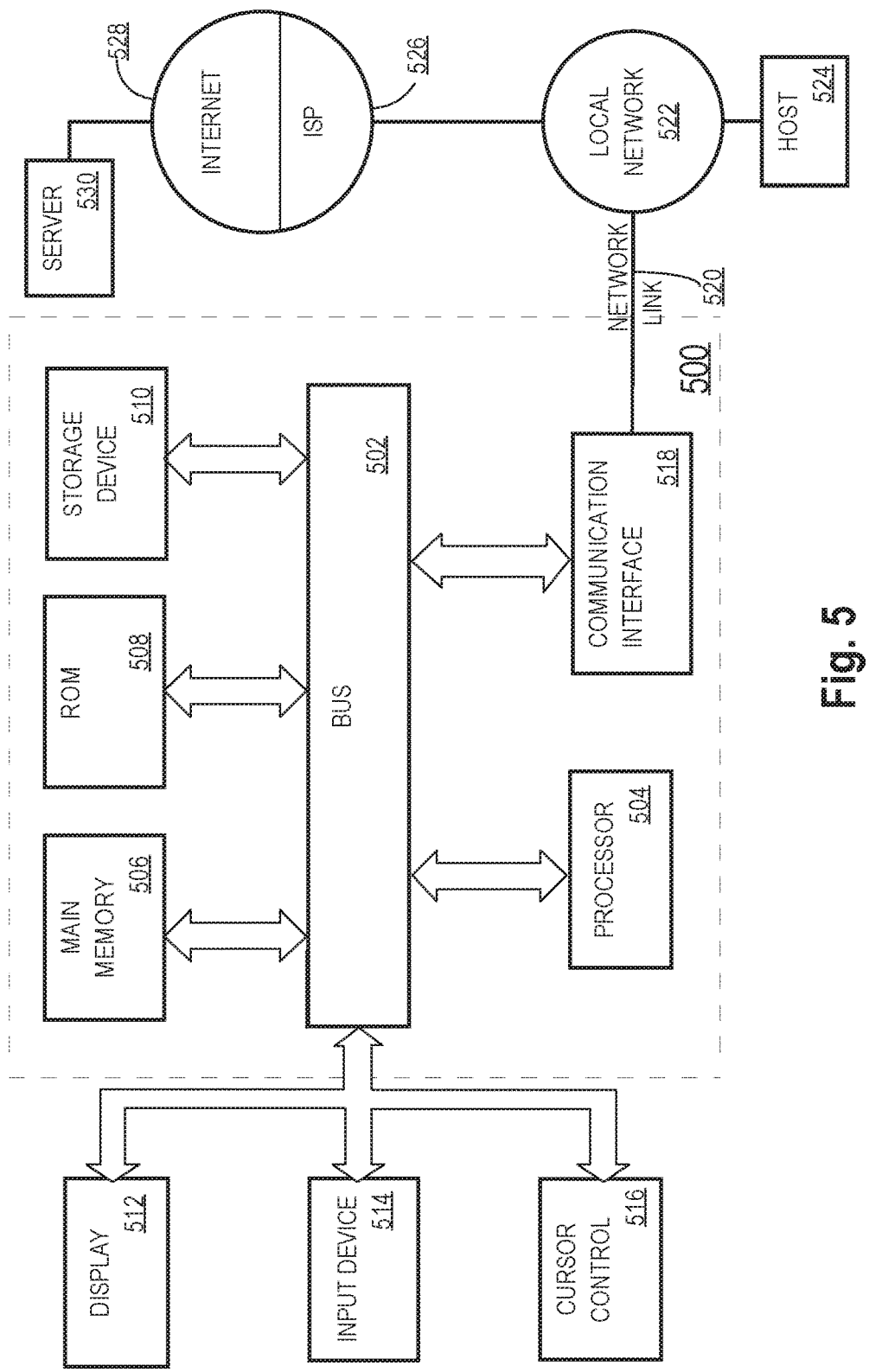
FIG. 5 illustrates an example computer system that may be specially configured according to the various embodiments described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving a query for a target data set managed by a database management system, the query specifying a predicate for a particular column of the target data set, said predicate comprising a filtering value to be compared with row values of the particular column of the target data set;
    prior to accessing a plurality of data block sets that store the target data set in persistent storage, identifying a plurality of in-memory summaries, each in-memory summary of said plurality of in-memory summaries corresponding to a corresponding data block set from the plurality of data block sets, said each in- memory summary comprising one or more in-memory data structures, each in-memory data structure of said one or more in-memory data structures representing values stored in the corresponding data block set in a corresponding column of the target data set;

wherein a particular in-memory data structure of said plurality of in-memory summaries represents values of the particular column stored in a particular data block set of said plurality of data block sets;

determining whether the particular data block set can possibly contain the filtering value in the particular column by at least determining, based on the particular in-memory data structure, a set of membership of said filtering value in the values of the particular column stored in said particular data block set;

if the determination is that the particular data block set cannot possibly contain the filtering value in the particular column, skipping a retrieval of the particular data block set from the persistent storage in evaluating the query;

if the determination is that the particular data block set can possibly contain the filtering value in the particular column, retrieving the particular data block set from the persistent storage for evaluating the query; and wherein the method is executed by one or more computing devices.

2. The method of claim 1, further comprising:
prior to receiving the query, generating the plurality of the in-memory summaries for the plurality of data block sets, the plurality of data block sets being selected for generating the plurality of the in-memory summaries based on a skip rate.

3. The method of claim 1, further comprising:
prior to receiving the query, generating the particular in-memory data structure for representing the values of the particular column stored in the particular data block set;

wherein the particular column is selected from a plurality of columns in the particular data block set based on statistics of each column of the plurality of columns, wherein the statistics include at least one of:
a cardinality of said each column, said cardinality of said each column being only for values stored in a data block set, and
a frequency of usage of said each column in predicates of one or more queries received by the database management system.

4. The method of claim 1, further comprising:
based on cardinality of the values of the particular column in the particular data block set or cardinality of the particular column, selecting to generate a dictionary data structure or a dense bloom filter data structure as the particular in-memory data structure; and
generating the particular in-memory data structure for representing the values of the particular column stored in the particular data block set.

5. The method of claim 4, wherein generating the particular in-memory data structure for representing the values of the particular column stored in the particular data block set comprises generating a respective hash value by applying a hash algorithm to each corresponding value, of the particular column in the particular data block set, stored in the particular data block set for the particular column and storing at least a portion of the respective hash value in the dictionary data structure as a representation of said each corresponding value of the particular column in the particular data block set.

6. The method of claim 4, wherein generating the particular in-memory data structure for representing the values of the particular column stored in the particular data block set comprises:
generating a respective hash value by applying a hash algorithm of cryptographic strength on each corresponding value stored in the particular data block set for the particular column;
identifying at least two sub-hash values of the respective hash value, wherein each sub-hash value of the at least two sub-hash values is statistically independent from other sub-hash value of the at least two sub-hash values;
based on said each sub-hash value, determining one or more bit addresses of a bit vector of the dense bloom filter data structure; and
setting one or more bits corresponding to the determined one or more bit addresses in the bit vector of the dense bloom filter data structure.

7. The method of claim 1, wherein the particular in-memory data structure is a dictionary data structure;
the method further comprising:
generating a hash value for the filtering value by applying a hash algorithm to the filtering value;
comparing the hash value of the filtering value to one or more hash values stored in the dictionary data structure;
if the hash value for the filtering value exists in the dictionary data structure, then determining the particular data block set can possibly contain the filtering value in the particular column of the target data set; and
if the hash value for the filtering value does not exist in the dictionary data structure, then determining the particular data block set cannot possibly contain the filtering value in the particular column of the target data set.

8. The method of claim 7, wherein a particular type of the hash algorithm and length of output hash values of the hash algorithm depends on metadata associated with said each in-memory summary.

9. The method of claim 1, wherein the particular in-memory data structure is a dense bloom filter data structure; and
the method further comprising:
generating a hash value for the filtering value by applying a hash algorithm of cryptographic strength to the filtering value;
identifying at least two sub-hash values of the hash value of the filtering value, wherein each sub-hash value of the at least two sub-hash values is statistically independent from other sub-hash value of the at least two sub-hash values;
using said each sub-hash value, determining for said each sub-hash value, one or more bit addresses of a bit vector of the dense bloom data structure;
if the one or more bit addresses of the bit vector for said each sub-hash value are set, then determining the particular data block set can possibly contain the filtering value in the particular column of the target data set; and
if the one or more bit addresses of the bit vector for said each sub-hash value are not set, then determining the particular data block set cannot possibly contain the filtering value in the particular column of the target data set.

10. The method of claim 9, wherein a particular type of the hash algorithm and length of output hash values of the hash algorithm depends on metadata associated with said each in-memory summary.

11. The method of claim 1, further comprising:
determining whether the particular in-memory data structure is a dense bloom filter data structure containing a bit vector or a dictionary data structure containing hash values; and
based on determining whether the particular in-memory data structure is the dense bloom filter data structure or the dictionary data structure, and to determine whether the particular data block set can possibly contain the filtering value in the particular column of the target data set, determining whether to generate a hash value that contains at least two sub-hash values from the filtering value by applying a hash algorithm of cryptographic strength to the filtering value, wherein each sub- hash value of the at least two sub-hash values is statistically independent from other sub-hash value of the at least two sub-hash values.

12. The method of claim 11, wherein determining whether the particular in-memory data structure is the dense bloom filter data structure or the dictionary data structure is based on metadata associated with the particular in-memory data structure.

13. One or more non-transitory computer-readable media storing sequences of instructions, which, when executed by one or more hardware processors, cause:
receiving a query for a target data set managed by a database management system, the query specifying a predicate for a column of the target data set, said predicate comprising a filtering value to be compared with row values of the particular column of the target data set;
prior to accessing a plurality of data block sets that store the target data set in persistent storage, identifying a plurality of in-memory summaries, each in-memory summary of said plurality of in-memory summaries corresponding to a corresponding data block set from the plurality of data block sets, said each in- memory summary comprising one or more in-memory data structures, each in- memory data structure of said one or more in-memory data structures representing values stored in the corresponding data block set in a corresponding column of the target data set;
wherein a particular in-memory data structure of said plurality of in-memory summaries represents values of the particular column stored in a particular data block set of said plurality of data block sets;
determining whether the particular data block set can possibly contain the filtering value in the particular column by at least determining, based on the particular in- memory data structure, a set of membership of said filtering value in the values of the particular column stored in said particular data block set;
if the determination is that the particular data block set cannot possibly contain the filtering value in the particular column, skipping a retrieval of the particular data block set from the persistent storage in evaluating the query; and
if the determination is that the particular data block set can possibly contain the filtering value in the particular column, retrieving the particular data block set from the persistent storage for evaluating the query.

14. The one or more non-transitory computer-readable media of claim 13, wherein the sequences of instructions further include instructions which, when executed by the one or more hardware processors, cause, prior to receiving the query, generating the plurality of the in-memory summaries for the plurality of data block sets, the plurality of data block sets being selected for generating the plurality of the in-memory summaries based on a skip rate.

15. The one or more non-transitory computer-readable media of claim 13, wherein the sequences of instructions include instructions which, when executed by the one or more hardware processors, cause:
prior to receiving the query, generating the particular in-memory data structure for representing the values of the particular column stored in the particular data block set;
wherein the particular column is selected from a plurality of columns in the particular data block set based on statistics of each column of the plurality of columns, wherein the statistics include at least one of:
a cardinality of said each column, said cardinality of said each column being only for values stored in a data block set, and
a frequency of usage of said each column in predicates of one or more queries received by the database management system.

16. The one or more non-transitory computer-readable media of claim 13, wherein the sequences of instructions further include instructions which, when executed by the one or more hardware processors, cause:
based on cardinality of the values of the particular column in the particular data block set or cardinality of the particular column, selecting to generate a dictionary data structure or a dense bloom filter data structure as the particular in-memory data structure; and
generating the particular in-memory data structure for representing the values of the particular column stored in the particular data block set.

17. The one or more non-transitory computer-readable media of claim 16, wherein generating the particular in-memory data structure for representing the values of the particular column stored in the particular data block set comprises generating a respective hash value by applying a hash algorithm to each corresponding value, of the particular column in the particular data block set, stored in the particular data block set for the particular column and storing at least a portion of the respective hash value in the dictionary data structure as a representation of said each corresponding value of the particular column in the particular data block set.

18. The one or more non-transitory computer-readable media of claim 16, wherein generating the particular in-memory data structure for representing the values of the particular column stored in the particular data block set comprises:
generating a respective hash value by applying a hash algorithm of cryptographic strength on each corresponding value stored in the particular data block set for the particular column;
identifying at least two sub-hash values of the respective hash value, wherein each sub- hash value of the at least two sub-hash values is statistically independent from other sub-hash value of the at least two sub-hash values;
based on said each sub-hash value, determining one or more bit addresses of a bit vector of the dense bloom filter data structure; and setting one or more bits corresponding to the determined one or more bit addresses in the bit vector of the dense bloom filter data structure.

19. The one or more non-transitory computer-readable media of claim 13, wherein the particular in-memory data structure is a dictionary data structure; and the sequences of instructions further include instructions which, when executed by the one or more hardware processors, cause:

generating a hash value for the filtering value by applying a hash algorithm to the filtering value;

comparing the hash value of the filtering value to one or more hash values stored in the dictionary data structure;

if the hash value for the filtering value exists in the dictionary data structure, then determining the particular data block set can possibly contain the filtering value in the particular column of the target data set; and if the hash value for the filtering value does not exist in the dictionary data structure, then determining the particular data block set cannot possibly contain the filtering value in the particular column of the target data set.

20. The one or more non-transitory computer-readable media of claim 19, wherein a particular type of the hash algorithm and length of output hash values of the hash algorithm depends on metadata associated with said each in-memory summary.

21. The one or more non-transitory computer-readable media of claim 13, wherein the particular in-memory data structure is a dense bloom filter data structure; and the sequences of instructions further include instructions which, when executed by the one or more hardware processors, cause:

generating a hash value for the filtering value by applying a hash algorithm of cryptographic strength to the filtering value;

identifying at least two sub-hash values of the hash value of the filtering value, wherein each sub-hash value of the at least two sub-hash values is statistically independent from other sub-hash value of the at least two sub-hash values;

using said each sub-hash value, determining for said each sub-hash value, one or more bit addresses of a bit vector of the dense bloom data structure;

if the one or more bit addresses of the bit vector for said each sub-hash value are set, then determining the particular data block set can possibly contain the filtering value in the particular column of the target data set; and if the one or more bit addresses of the bit vector for said each sub-hash value are not set, then determining the particular data block set cannot possibly contain the filtering value in the particular column of the target data set.

22. The one or more non-transitory computer-readable media of claim 21, wherein a particular type of the hash algorithm and length of output hash values of the hash algorithm depends on metadata associated with said each in-memory summary.

23. The one or more non-transitory computer-readable media of claim 13, wherein the sequences of instructions further include instructions which, when executed by the one or more hardware processors, cause:

determining whether the particular in-memory data structure is a dense bloom filter data structure containing a bit vector or a dictionary data structure containing hash values; and based on determining whether the particular in-memory data structure is the dense bloom filter data structure or the dictionary data structure, and to determine whether the particular data block set can possibly contain the filtering value in the particular column of the target data set, determining whether to generate a hash value that contains at least two sub-hash values from the filtering value by applying a hash algorithm of cryptographic strength to the filtering value, wherein each sub- hash value of the at least two sub-hash values is statistically independent from other sub-hash value of the at least two sub-hash values.

24. The one or more non-transitory computer-readable media of claim 23, wherein the sequences of instructions further include, instructions which, when executed by the one or more hardware processors, cause determining whether the particular in- memory data structure is the dense bloom filter data structure or the dictionary data structure based on metadata associated with the particular in-memory data structure.

* * * * *

UNITED STATES PATENT AND TRADEMARK OFFICE
CERTIFICATE OF CORRECTION

PATENT NO. : 10,198,363 B2
APPLICATION NO. : 15/268524
DATED : February 5, 2019
INVENTOR(S) : MacNicol et al.

It is certified that error appears in the above-identified patent and that said Letters Patent is hereby corrected as shown below:

In the Claims

Column 18, Line 66, Claim 1, delete "in- memory" and insert -- in-memory --, therefor.

Column 19, Line 1, Claim 1, delete "in- memory" and insert -- in-memory --, therefor.

Column 19, Line 12, Claim 1, delete "in- memory" and insert -- in-memory --, therefor.

Column 19, Line 58, Claim 5, delete "in- memory" and insert -- in-memory --, therefor.

Column 20, Line 2, Claim 6, delete "in- memory" and insert -- in-memory --, therefor.

Column 20, Line 10, Claim 6, delete "sub- hash" and insert -- sub-hash --, therefor.

Column 21, Line 18, Claim 11, delete "sub- hash" and insert -- sub-hash --, therefor.

Column 21, Line 41, Claim 13, delete "in- memory" and insert -- in-memory --, therefor.

Column 21, Line 43, Claim 13, delete "in- memory" and insert -- in-memory --, therefor.

Column 21, Line 54, Claim 13, delete "in- memory" and insert -- in-memory --, therefor.

Column 22, Line 61, Claim 18, delete "sub- hash" and insert -- sub-hash --, therefor.

Column 24, Line 31, Claim 23, delete "sub- hash" and insert -- sub-hash --, therefor.

Column 24, Line 39, Claim 24, delete "in- memory" and insert -- in-memory --, therefor.

Signed and Sealed this
Twenty-first Day of January, 2020

Andrei Iancu
*Director of the United States Patent and Trademark Office*